Dec. 4, 1962    J. W. BEATTY    3,066,589
DAY NIGHT AERIAL PHOTOGRAPHIC SYSTEM
Filed March 7, 1960    7 Sheets-Sheet 1

INVENTOR.
JOHN W. BEATTY
BY
ATTORNEYS

Dec. 4, 1962     J. W. BEATTY     3,066,589
DAY NIGHT AERIAL PHOTOGRAPHIC SYSTEM

Filed March 7, 1960     7 Sheets-Sheet 2

INVENTOR.
JOHN W. BEATTY
BY
ATTORNEYS

Dec. 4, 1962 J. W. BEATTY 3,066,589
DAY NIGHT AERIAL PHOTOGRAPHIC SYSTEM
Filed March 7, 1960 7 Sheets-Sheet 4

INVENTOR.
JOHN W. BEATTY
BY
ATTORNEYS

United States Patent Office 3,066,589
Patented Dec. 4, 1962

3,066,589
DAY NIGHT AERIAL PHOTOGRAPHIC SYSTEM
John W. Beatty, Dayton, Ohio, assignor to the United States of America as represented by the Secretary of the Air Force
Filed Mar. 7, 1960, Ser. No. 13,403
8 Claims. (Cl. 95—12.5)
(Granted under Title 35, U.S. Code (1952), sec. 266)

The invention described herein may be manufactured and used by or for the United States Government for governmental purposes without payment to me of any royalty thereon.

This invention relates to a new method and apparatus for aerial photographic reconnaissance and, more particularly, to a self-contained, self-powered automatically operated photographic system whereby aerial exposure of film over a planned course is made, a positive transparency of the exposed film developed, and the information contained on the film is transmitted to ground reception during the flight, and as the exposure is being made.

The present invention seeks to solve many of the critical difficulties and problems now inherent in aerial photography. In the system now available, the exposures are made during a planned run and the information contained on the film is made available for use only after the flight has been completed and the film has been transported to ground facilities where it may have to be transported a distance before it can be developed. Inherent in this system is the time delay involved, and the possibility of accidents and loss of the information obtained before it has been converted into usable form.

Further, when an aircraft is equipped with sufficient photographic equipment to carry out extensive photographic missions, the use of an entire aircraft is limited to this specific use. The present invention provides a detachable unit, specifiically a wing tank, in which all of the equipment is carried and which can be attached to and detached from an aircraft. The invention thus gives versatility to high speed aircraft equipment, which would otherwise be restricted to photographic missions.

Further, aerial photographic missions are essentially limited to daytime activity, because of the many problems involved in nighttime ground illumination, such as sufficient intensity of illumination and the problem of exposure of the position of the plane illuminating large ground areas. The system of the present invention is capable of twenty-four hour service. A thin strip of intense illumination moves forwardly over the ground track, and at right angles to the center line of the track, so that no single spot on the ground is illuminated more than momentarily.

There are many other problems inherent in aerial photography. One of these is the difficulty of a camera focus to stay "on track" because of the changes in drift angle and pitch angle of the aircraft. The present invention provides a camera mount control which is responsive to drift angle data received from a Doppler radar carried in the tank so that the axis of the camera lens is maintained in a position parallel to the center line of the course. Film speed control through the camera is also controlled by altitude data and ground speed data received from instruments carried in the system.

The system provides a developing and processing unit which makes a positive transparency film from the camera exposed film, and scanning and transmitting equipment for receiving the information contained on the positive transparency film, transmitting it during the flight to ground reception. The time required to develop the transparency film, once it contacts the camera exposed film is a constant. The camera film speed, due to changes in altitude and ground speed of the aircraft is a variable.

Also, the speed of the scanning operation is subject to variation, as the areas of the film passing it contain intelligence or no intelligence. The areas containing no intelligence are speeded up past the scanner. The invention provides two film storage areas for damping out these rate differences.

All of the processes of the system are carried out by components carried in the wing tank. All of the operations are completely automatic and the only duty of the pilot is the flying of the aircraft over a designed course. The system contains a cockpit control box so that it can alternatively be made subject to manual operation from the cockpit.

The system contains within itself both a generator for furnishing all of the power needed by all of the components, the generator being powered by a flight propelled turbine which the wing tank carries, and a ram air cooling system.

The invention opens a completely new field in the area of photographic aerial reconnaissance and provides a new system, a new method and a new device for accomplishing its objectives.

Other objectives accomplished by the device of the present invention will appear as the description proceeds.

Referring to the drawings,

FIG. 1a is a view of the forward portion of the wing tank showing the power generating system, the ground lighting system, and the air scoop cooling system.

FIG. 1b shows schematically the rear portion of the wing tank, where the camera, the film storing compartment and the developing and scanning units are located.

FIG. 3 is a schematic representation in cross section of the rotating developing drum, and the scanning device contained therein.

FIG. 8 is a block wiring diagram of the elements necessary to provide external ground power to the components of the device when ground operation is desired.

Referring more in detail to the drawing, the numeral 10 indicates generally a wing tank capable of being carried by any type of high speed aircraft equipped with means for carrying wing tank loads. The tank 10 is attachable to any type of high speed aircraft by shackle bolts or bomb rack mounting hooks 12, or other expedient means. A generator 14, located in the forward portion of the tank, is powered by ram air turbine 16 and provides all of the electrical energy needed for operating all of the components of the entire system during flight. Voltage regulator and power distributor for the system are shown schematically at 19. For ground operation of the system, a ground receptacle 18 is provided for connection to an accessory power unit 20, which provides A.C. and D.C. power. The wiring diagram for supplying the power for ground operation is shown in FIG. 8.

Sufficient cooling for all components of the system is provided by ram air scoops 22 and a system of branch ducts 24 are led to lamps, to processing apparatus, and wherever cooling is required. Exhaust slots are provided as necessary in the skin of the tank, for example, the slots shown at 26 in FIG. 1a. If additional cooling is required, a boot strap type refrigeration unit 28 may be inserted in the system to be driven by the generator 14. (See FIG. 9.)

Illuminating Component

Figure 2:
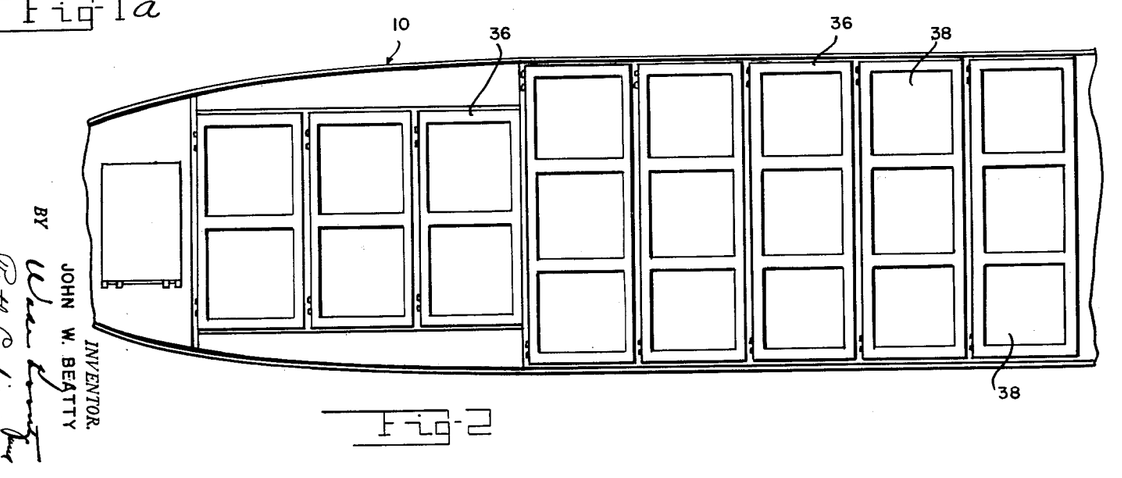
FIG. 2 is a ground eye view of the belly of the portion of the tank shown in FIG. 1 and looking upward from below.
Figure 4:
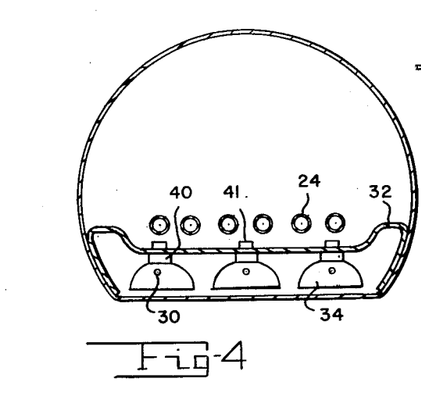
FIG. 4 is a schematic view taken substantially on the line 4—4 of FIG. 1a, showing the cross-sectional configuration of the wing tank.
Figure 5:
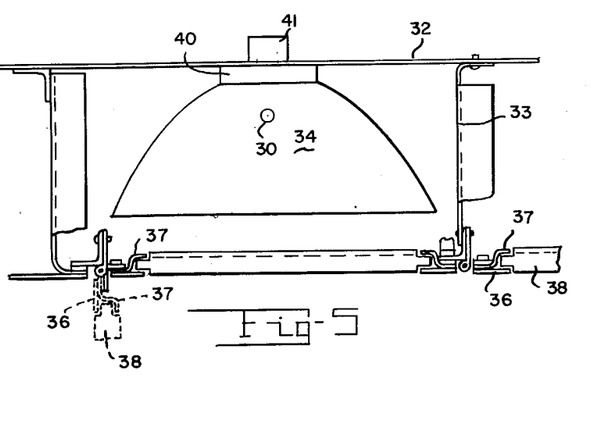
FIG. 5 is a view on a larger scale of a single lamp and its mounting showing in phantom the open position of the access door in which it is mounted.

The ground area along the course is illuminated by a high intensity lighting system, which comprises in the present showing of the invention, a system of 21 lamps arranged in three's and two's as shown in FIG. 2. An example of the type of lamp that can be used is the General Electric BH6 type mercury arc lamp or its equivalent. These lamps indicated by the numeral 30 on the drawing are electrically powered by ballast elements 41 and are suitably mounted, as for example, on the longerons 32 by means of brackets 33 and each lamp is provided with a parabolic reflector 34. Ready access is provided by hinged doors 36. At least one door being provided for every three lamps. (See FIGS. 2 and 5.)

Figures 6, 7:
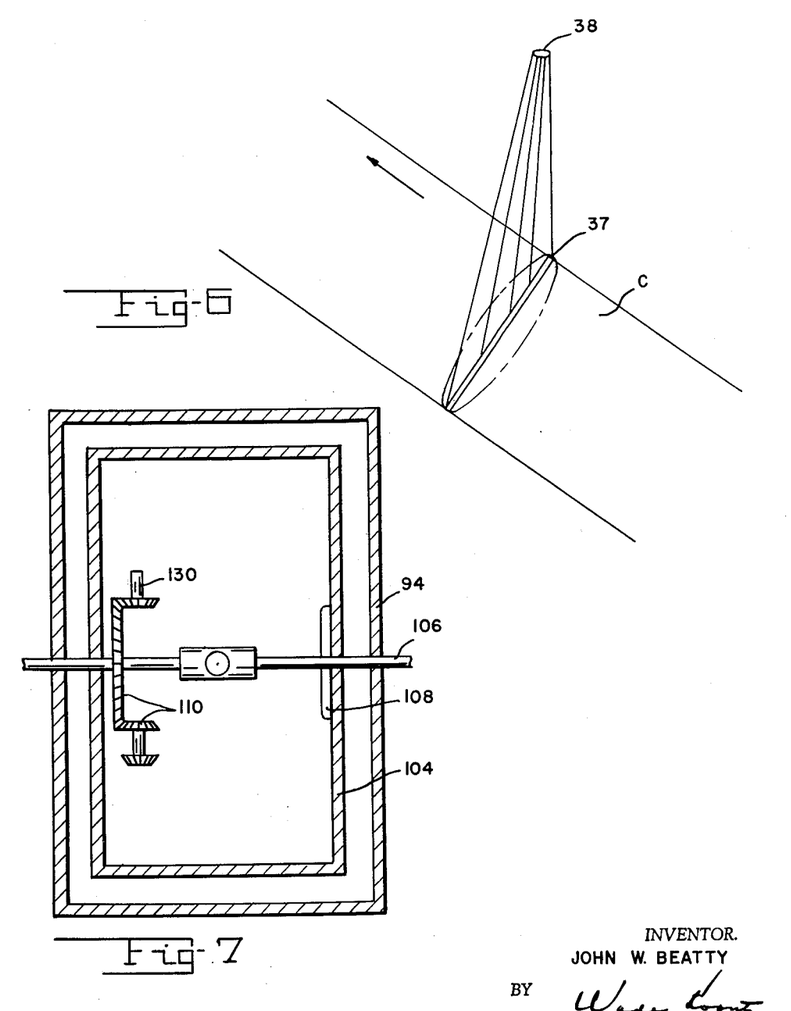
FIG. 6 is a schematic representation of the manner of diffusion and restriction of the light rays and the configuration of the illuminated ground area.
FIG. 7 is a cross-sectional view showing the mounting of the developing and scanning drums with most of the interior equipment removed.

The pattern of light to be projected to the ground below the aircraft is in the form of a thin, concentrated rectangle (see FIG. 6) extending laterally across the line of flight, normally to it and advancing forwardly over it. Any single point on the ground is thus illuminated only momentarily. This pattern has an even and uniform brightness and a high intensity over the entire thin rectangle, and is illustrated schematically at 37 in FIG. 6. Some scattering of rays may occur, forming an elliptical fringe area. The concentration of light, however, is in a thin line, at right angles to the center line of the course, and advancing forwardly over it.

This light distribution is accomplished by two elements. Parabolic reflectors 34 restrict backward and forward spread of the light rays. A series of prismatic diffusing lenses or optical windows 38 operate in such a way that the beams of light thrown by each lamp onto the lens are disbursed laterally. The lenses 38 are mounted in brackets 39 (see FIG. 5) in the access doors 36, which are located in the underneath surface of the wing tank. The lenses are so arranged that the projected light pattern can be directed downwardly and rearwardly at a slight angle to the vertical. This rearward projection of the light rays prevents direct reflection into the strip camera slit opening, when the aircraft is flown over water, and is coordinated with the camera mount adjustment and the direction of focus of the camera lens.

Figure 9:
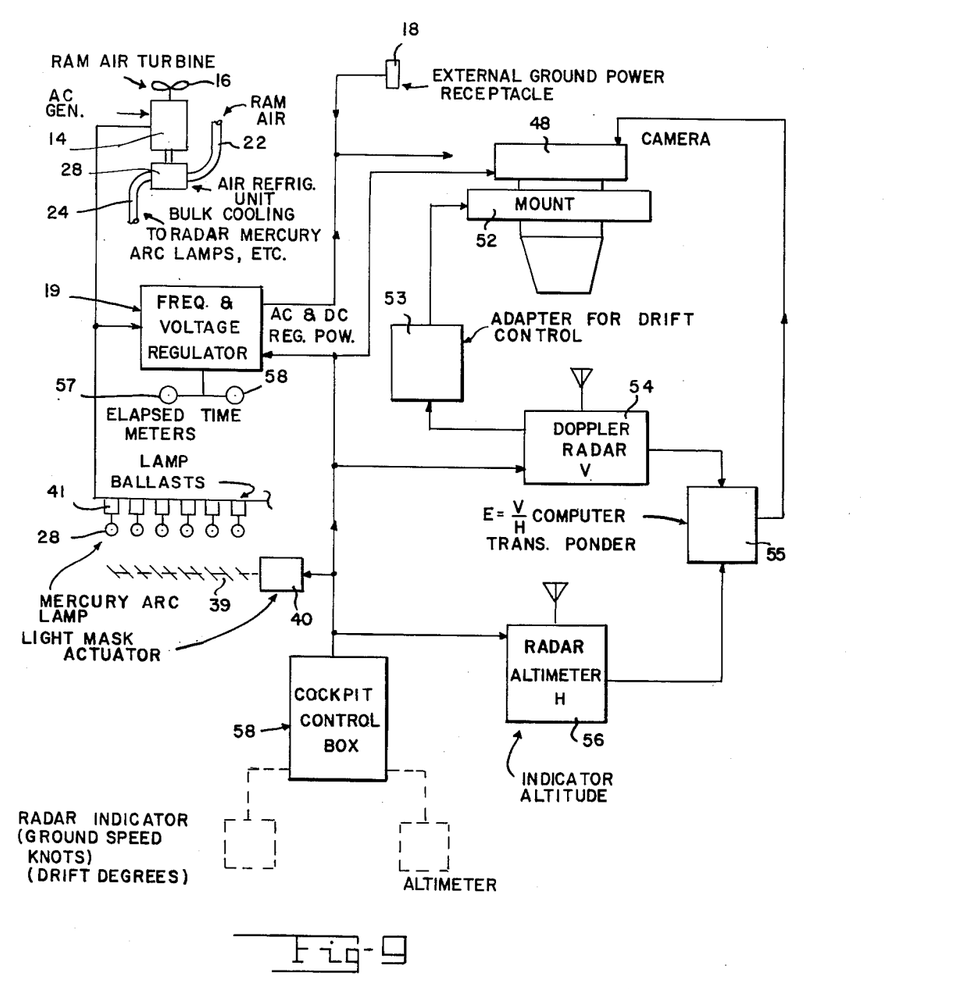
FIG. 9 shows a wiring diagram of the complete integrated system.

In instances where pilots objected to exposing their present and position by such a downwardly directed light over the complete course, these windows were provided in some instances with closing doors or shutters or light masks 39, shown schematically on the diagram of FIG. 9. When they are used they are operated by the pilot from the cockpit through an actuator system 40, so that the light may be shielded from ground detection, except during actual periods of operation, without turning off the lights once they are turned on for the run.

Weight as ballast is installed wherever necessary, weight and location of the ballast elements being carefully calculated to balance the weight of all components of the system to place the center of gravity midway between the two points of support of the tank, as shown, the shackle bolts 12. Ballast member 43 (FIG. 1b) placed in an extreme rearward position in the wing tank is an example.

Figure 1A:
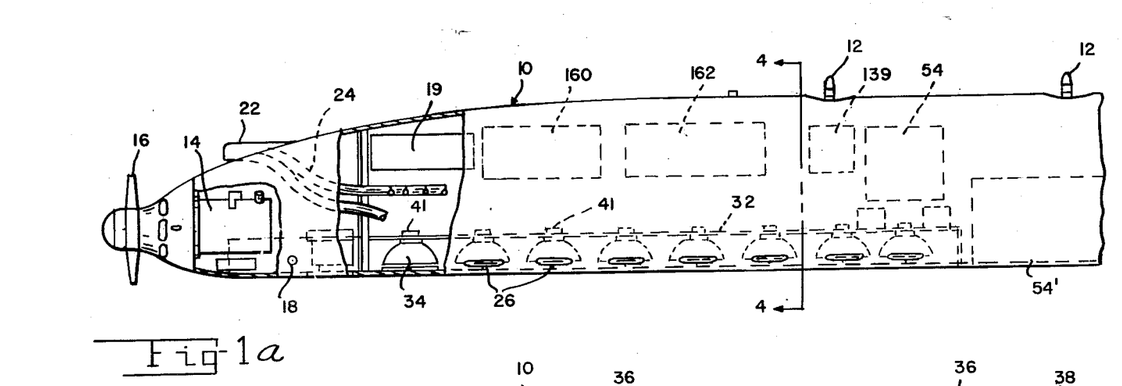
FIGS. 1a and 1b taken together are a schematic, longitudinal view of the entire wing tank, partly in elevation and partly in cross section.
Figure 1B:
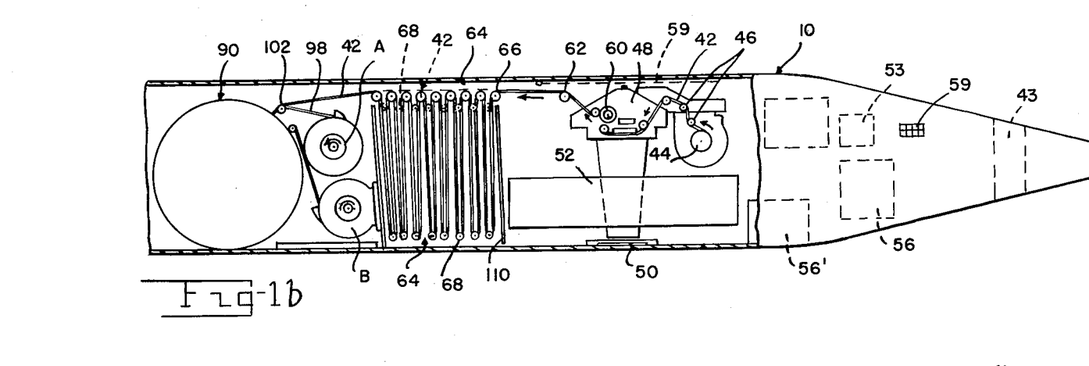

Referring now to FIG. 1b, a film 42 is stored on a storing spool or cassette 44. Because of the necessity for saving vertical space, the cassette 44 is placed lower than the camera instead of the usual position obliquely above. The film is threaded over guide and drive rollers 46 into the camera 48. The camera 48 is of the strip camera type, having a slit opening which is left open during a planned run. A photographic window 50 of suitable specifications to provide a clear view is provided in the belly of the tank directly below the camera.

Camera Mount

The axis of the camera lens maintains a position parallel to the center line of flight regardless of the pitch and drift of the aircraft. This is accomplished by the camera mount 52 and its controls, which respond to data received from a Doppler radar unit 54. One function of the radar unit 54 is to provide "drift" information to the camera mount. A drift control adapter 53 containing suitable circuitry to handle the conversion of drift information from the radar unit to the camera mount may be required for effecting the correction and elimination of aircraft drift to hold the camera and camera lens to the position of "track" orientation.

Film Speed Control

The speed of the film 42 through the camera 48 is controlled by altitude data received from a radar altimeter 56, and ground speed information received from the Doppler radar 54, which, in addition to providing drift information to the camera mount, also provides ground speed information to the camera film speed controls. A transponder unit 55 accepts the altitude data from the radar altimeter 56 and ground speed information received from the Doppler radar unit 54 and presents an acceptable $EV/H$ voltage to the film drive speed control, where V is the ground speed information and H is the altitude information.

FIGS. 1a and 1b show in phantom possible physical locations for the Doppler frequency tracker or Doppler radar 54, its antenna 54′, the radar altimeter 56 and its antenna 56′. FIG. 9 shows these elements in the wiring diagram for the whole system.

A pair of elapsed time meters 57 are wired into the circuit. Both of these are indicated for simplicity at 57 in FIG. 9. One meter records by minutes the hours of complete operation of the system, not including the warm up periods. The other records only the total hours of operation of the turbine while in flight.

While the system is designed to operate during a given run automatically, without attention by the pilot flying the aircraft, a cockpit control box 58 (FIG. 9) provides an alternative system of manual operation.

An access door 59 provides ready access from the top of the tank to the camera 48. The film 42, after exposure in the camera, is lead by drive roller 60 and guide rollers 62 into the storage compartment or hopper 64. The load or length of film stored in the hopper 64 varies with the demand of the developing drum, which is a constant, and the film rate through the camera, which is a variable, and dampens out these rate differences. The hopper is provided with two series of rollers 66 and 68. These rollers have parallel axes and are of sufficient length to receive the width of the film. The rollers 66 have stationary journals located in the upper portion of the compartment or hopper 64, while the rollers 68 are mounted in a floating frame (not shown). The film 42 is threaded over a roller 66, under a roller 68, over a roller 66, and so on. The floating frame is raised and lowered, varying with the load or length of film being stored in the hopper. FIG. 1b shows the rollers 68 in full lines at their lowermost position and the hopper at its maximum film load. The dotted line position shows the rollers 68 in their raised position with a reduced film load.

If a flight is planned which includes only film exposure and no processing during the flight, the film is threaded during the "loading" process, to bypass the film storage hopper 64. In this event, the film passes directly over the rollers as shown in dotted lines in FIG. 1b.

When the system is "loaded" however, for processing and transmission of information during the flight, the film is "threaded" through the rollers 66 and 68 as above described.

The developing time for the developing process, later described, is a constant. For the present particular design, this time is 5 ft. per min. or 1 in./sec. The rate of the film leaving the storage hopper 64 to the developer is therefore a constant for any given design. The film speed through the camera, in the following example referred to as image motion compensation or I.M.C. speed, is a variable. This rate difference is compensated for in the storage hopper 64.

*Example of I.M.C. Speed and Storage*

A minimum I.M.C. speed with no film storage; a 7 in. focal length camera lens flying at 430 K at a maximum altitude of 5,000 feet will allow continuous and complete flow of all film through the camera 52 to the processor 90, without interim storage. When no storage is required, a time interval of approximately two minutes elapses between obtaining the latent image and the start of the picture transmission. An 80 minute run at this altitude provides 572 nautical miles of ground coverage. With a longer focal length lens, as for example, a 9 inch F.L. lens, the aircraft must either reduce speed from 430 K to 340 K or increase altitude to 6,500 feet or a combination of both, in order to maintain an image motion compensation film speed of 1 inch/sec. If the aircraft ground speed is increased, or altitude decreased, the film rate increases and the film begins to store in the hopper 64. As the maximum speed and minimum altitude is reached, and the maximum film speed is approached, the storage capacity of the hopper compartment is also reached. The capacity of the hopper as designed is 28 feet of exposed but undeveloped film.

The maximum I.M.C. speed is achieved at, for example, 627 K at an altitude of 1,200 feet, with a 9 inch focal length lens, at which time the I.M.C. speed is 8 in./sec. At this condition, the aircraft ground speed can obtain 10+ linear miles of ground coverage, representing 54 sec. of film storage capacity. A corresponding recovery time is necessary before a like amount of coverage could be obtained without increasing the storage capacity of the system, or lengthening the contact process length of 5 ft. (later described). The present design, however, is based on one minute process time, with 1 in./sec. film speed representing 5 ft. of contact length. Conversely, an increase in altitude or decrease in camera film speed would permit proportionally greater ground coverage. At a maximum I.M.C. rate, approximately 115 nautical miles of ground coverage can be obtained, and would require 12 minutes for photography and 12 minutes for recovery time.

*Developing and Storing*

The developing and scanning unit is generally designated by the numeral 90. It is comprised of an outer shield member or housing 92, which surrounds and protects an outer stationary developing drum 94, and the films which are developed on its outer surface. The film 42 comes from the storage compartment 64 and passes around a tension detecting roller 96. At this point, the camera exposed film 42 encounters an unexposed film 98, which reels from a clutch driven supply spool A (FIGS. 1b and 3). As the emulsion sides of the two films 42 and 98 are contacted, a developing reagent is added. They are moved along by the actuating roller 102, and pass around the exterior of the stationary drum 94. The drum 94 is the developing element referred to above whose circumference or contact length, for the purpose of the examples noted above is five feet. The stationary developing drum 94 and the inner revolving and storing drum 104 are concentric and spaced, and are mounted on a common rotating axis 106. The mounting of the stationary and revolving drums on the revolving axis 106 is shown schematically in FIG. 7. The drum 94, which remains stationary, journals on shaft 106, while the drum 104 has rigid connection with it and rotates with it (see plate 108, FIGS. 3 and 8). The shaft 106 is actuated for rotation through a gear train, shown in part at 110, from a motor 112.

At the end of the developing period, the camera film 42 and the film 98 are separated. The film 42 passes over suitable guide rollers 114 and is stored on slip clutch driven film storage spool B. The film 98, which now carries the image of the exposed film in the form of a positive transparency, passes between a pair of drive rollers 120, over a microswitch control 122 which shuts off the motor 112 at the end of the operation. It passes around the revolving drum 104, travelling with it for at least one revolution, and passes into its interior through a slit opening 124. It is propelled by a pair of drive rollers 126 and travels past a scanner indicated generally by the number 140 (later described), into a system of metering rollers 128 geared to the shaft 106 through gear train indicated schematically at 130, FIG. 7, and finally rolls onto a take up pool C, onto which it was threaded during the original "loading" of the system.

The inner drum 104 is capable of two speeds of rotation in one direction (clockwise as the device is oriented in FIG. 3) and one speed in the reverse direction. As noted above, the drums 92 and 104 are spaced, a storing compartment being thus provided between them. As noted above, the development rate is constant, while the scanning rate is variable depending upon the presence of lengths of film upon which no intelligence has been received. Storage is therefore necessary to compensate for the difference between the rate at which the developing unit takes up the film (a constant) and the rate which represents the demand of the scanner, a variable. If these rates are the same, the positive transparency film 98 winds only once around the revolving drum, moving with it counterclockwise, passing immediately into the interior of the drum 104 through a slot 124 provided for this purpose. If the demand rate of the scanner is less than the rate of rotation of the drum, then the film stores on the surface of the drum in successive layers. When the demand of the scanner exceeds the rate of storage, the direction of the drum is reversed. It now rotates in a clockwise direction in either of two speeds, depending upon the scanner demand.

The scanning rate is governed by a scan detector 132. The film passes an opening 134. Light from a light source 136 is reflected by a reflecting surface 138, illuminating the film 98 as it passes the opening 134. The light sensitive scan detector 132 is activated or shut down by black or transparent film which represents the absence or presence of intelligence on the film. Thus, areas of black film which carry no intelligence can be speeded up and rushed past the scanner. The controls are located in a sequence timer unit 138 located in the tank outside the drum, and shown schematically in FIG. 1a.

*Scanning and Transmission*

The scanning operation is accomplished by a scanning device indicated generally by the numeral 140. It will be noted that all of the equipment contained in the drum 104 has rigid mounting with respect to the interior surface of the drum and moves with it. Spider arms 142 are thus mounted, and provide journal bearing support 144 for the rotating scanner 140. The scanning unit is actuated for rotation about the journal bearing 144 as an axis by the motor 112 through a gear train partially shown at 145. The scanning unit 140 is formed with three hollow radially extending arms 146, each of which has a scanning head 148. A microscope type objective lens, located in each scanning head 148, scans the width of the film in a wide arc and receives the image from the film which is illuminated from its opposite surface by a light source 156. The film image is received from the microscope lens by a mirror 150 which deflects it down the length of the hollow arm 146 onto one of the reflecting surfaces of a reflecting unit 152. The reflecting unit 152 is a triangular pyramidal mirror, located at the open inner ends of the hollow radial arms 146, a reflecting surface for each arm. The image is here redirected through the tubular bearing unit 144 and received by a photoelectric element 154, preparing suitable impulses for ground reception. A line scan amplifier and transmitter are shown schematically at 160 and 162 respectively in FIG. 1a. Since the drum 104 is mounted for rotation, and since the drum contains the several components, the scanner, the scanning speed regulator, the motor, metering devices, gear trains, etc., counterweights 164 of carefully selected magnitude are distributed at carefully selected locations to effect perfect balance.

Modes of Operation

While adaptable to many modifications in modes of operation, the design of the system, as shown, operates from an aircraft over a wide range of speed and altitude in three basic modes of operation to provide twenty-four hour capability. The system has a designed capability to speeds of .95 Mach and altitudes to 15,000 feet. In all modes of operation, the $E V/H$ voltage applied to the film drive controls is obtained from the combined output of Doppler radar 54 and radar altimeter 56; and the drift angle or azimuth setting of the camera mount is controlled automatically from the drift indicating output circuit of the Doppler radar 54, as above described.

Figure 10:
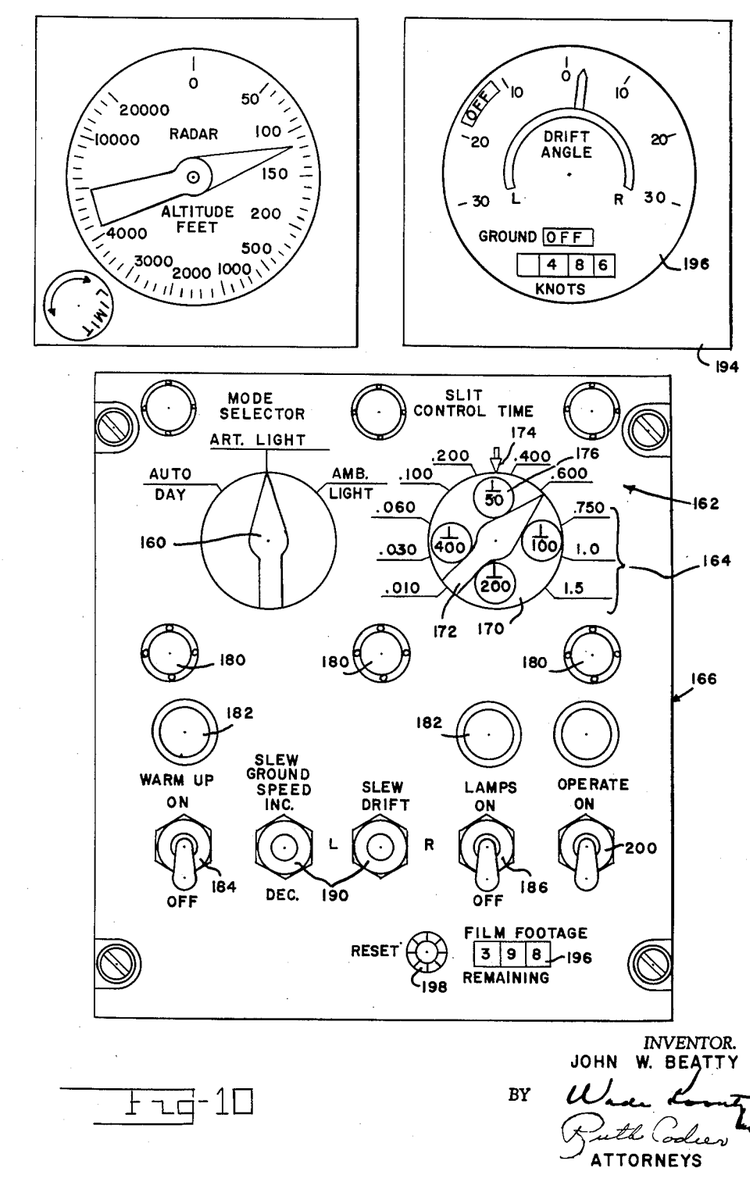
FIG. 10 is a schematic view of the cockpit control box.

The mode selection controls are shown in FIG. 10, which is a schematic showing of the cockpit controls. The three modes of operation above referred to are (1) Daylight or Auto-day, (2) Artificial Light or Art. Light and (3) Ambient Light, such as moonlight. The selection of the mode of operation is made by the selector switch 160 shown in FIG. 10 and is made before the run starts. The selection of the mode of camera slit control is made on a slit control dial 162. This selection is also made before the run starts and is determined by conditions of the run. One of these conditions is the kind of film to be used in the camera. The time slit control device is a unique mechanism contrived for the present system. A series of incremental designations 164, in the present case, in inches are provided on a basic element 166. This element, in the present design, is a panel illuminated from behind, and carries the designations of .010 inch to 1.5 inches arranged in circular formation. These are camera slit opening widths, and in the "Artificial Light" mode of operation, the slit width is a fixed width. The selection is made and thereafter remains constant throughout the run. Mounted on the panel 166 is a disc 170, provided with a raised handle 172 rigidly mounted thereon. The disc 170 is mounted for rotation with respect to the panel 166 and is concentric with the inch designations 162. The handle member 172, which rotates with the disc 170 also functions as a pointer. The setting of the slit opening in "Artificial Light" mode of operation is made by rotation of the disc 170 to set the indicator 172 at the desired slit width. In daylight and ambient light, the slit opening is not fixed but is controlled by light metering devices which vary its width. The setting for this mode is accomplished by moving the disc 170 until the arrow 174, which is carried by the panel element 166, points to the proper time indication 176. There are four such indications on the disc 170, each indicating a kind of film which may be used in the camera.

Lights are indicated at 180 and 182. The lights 180 are for panel illumination and, if the panel 166 is ground glass, these lights are placed behind it. The lights 182 are indicator lights, which indicate the off and on positions of the "Warm Up" switch 184, the "Lamps" switch, and "Operate" switch 188. The slew switches 190 are for correction of ground speed and drift angle indication on the Doppler radar indicator 194, and to key it for operation in a corrected position. The panel also is provided with a remaining film indicator, and a "reset" for adjustment at the time of loading at the beginning of the run. An "operate" switch places the film camera drive in control of an "off" "on" device located on the control stick and conveniently located for operation by the pilot.

To summarize the modes of operation:

(1) *Daylight.*—With the "Mode Selector" switch 160 in "Auto-Day" position, the camera slit opening control (the position of an indication 176 on the disc 170 with reference to the arrow 174) functions as an exposure determining control. The "Lamps" switch 186 is rendered ineffective in the circuit. The "Warm Up" switch 184 turns on the entire system. The "Slew Control" for keying in the Doppler radar indicator 194 is operative. The film drive is activated by the "Operate" switch 200.

(2) *Artificial light.*—With the mode selector switch in "Art. Light" position, the slit control switch 172 functions to set the camera slit opening to the fixed actual incremental unit desired, as described above, rather than to indicate relative exposure time. In this mode, the "Lamps" switch 186 is effective and turns on the mercury arc lamps 30. The "Warm Up" switch and "Slew Control" function as described in (1) "Daylight" above. The "Operate" switch in this mode of operation causes the camera film drive motor to be activated and will simultaneously operate the mask actuator to open the light masks over the mercury arc lamps, if the masks are included in the design.

(3) *Ambient light.*—With the mode selector switch in "Ambient Light" position, the system functions as in the Art. Light mode, except that the "Lamps" switch is inoperative or, if the lamps are left on, then the mask actuator does not function to open the light masks.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. An aircraft wing tank for photographic aerial reconnaissance of a designed ground course comprising a wing tank body, a strip camera mounted in said wing tank body and focused downward, a lighting system co-ordinated with the focus of said camera and comprising a plurality of high intensity lamps, a parabolic reflector for each of said lamps for directing the beams of light from each lamp downwardly and confining the beams from forward and backward spread, access doors located in the belly of said wing tank, optical windows mounted in said access doors, one window for each lamp, for directing the light rays received thereon downwardly at a slight rearward angle to the vertical and for spreading said light rays transversely across the ground course, so that a thin line of intense illumination transverse to the ground course travels forwardly along the ground course.

2. A photographic processing component for processing exposed photographic film during aerial flight comprising an outer stationary drum having sufficient circumferential length for developing of film, an inner drum, said inner and outer drums being spaced and mounted on a common rotary axis shaft, the outer stationary drum having journal relationship therewith, the inner drum having rigid connection therewith for rotation therewith, a motor mounted on the interior of said inner drum for providing rotation of said inner drum at one speed in one direction for film development and storage, and two speeds in the reverse direction to meet variations in scanning rate requirements, means for effecting contact of a camera-exposed film and an unexposed film for which developing reagent has been provided, means for conducting the two superimposed films around the outer surface of said outer stationary drum for developing said exposed film and transferring the image contained thereon to the unexposed film in the form of a positive transparency, means for separating the two films, means for storing the camera-exposed film, means for conducting said positive transparency from said outer drum to the outer surface of said inner drum for storing of said positive transparency film in successive layers thereon if necessary to compensate for the difference in rate between developing process and scanning process, film scanning means located on the interior of said inner drum, means for conducting the positive transparency past said scanner, light sensitive means for controlling film speed past said scanner, said means being governed by presence or absence of intelligence on said film, means incorporated in said scanning means for transmitting the information contained on said positive transparency to a photoelectric element and means for receiving said information from said photoelectric element and transmitting said information to ground reception.

3. A processing component for processing exposed photographic film, and scanning said film preparatory to transmitting the information contained thereon for ground reception, said processing component comprising concentric inner and outer spaced drums mounted on a common rotating shaft, said inner drum being rigidly mounted with respect to said rotating shaft and rotatable with it, said outer drum being stationary and providing on its exterior a surface of suitable length for developing film, an opening in the surface of said inner drum for the entrance of the developed film into the interior of said inner rotating drum, means for scanning film rigidly attached to the interior surface of said inner drum, means for guiding film past said scanner, light sensitive means for controlling the rate of film speed past said scanner, said means being controlled by the presence or absence of information on the film, means for storing the developed film to dampen out rate differences between the rate of developing and the varying demand rate of the scanner, the excess film winding around the inner rotating drum and being stored thereon in successive layers in the space between said inner and outer drums, said inner drum being capable of reversing its direction according to the demand of the scanner.

4. In a photographic system for day-night operation, a control panel comprising a mode selector switch on said panel capable of making mode selection for daylight, artificial light, or ambient light operation, a camera slit control selector comprising linear slit opening width indications arranged in incremental units and in circular formation on said panel, a dial mounted on said panel for rotation with respect thereto and concentrically located with respect to the linear slit opening incremental units, a pointer on said panel and rigid with respect thereto, time exposure incremental units located radially on said disc and moving with said disc with respect to said pointer, said pointer indicating slit opening time exposure incremental units, a handle placed diametrically on said disc providing manual means for rotating said disc, said handle being formed in the shape of an arrow and providing an indicator coordinating with the linear incremental units to make selections thereof, the mode selector operating in daylight and ambient light position to activate said slit opening selector to time exposure selection of said pointer with respect to the time exposure incremental units on said disc, said artificial light mode selector operating to actuate said slit opening selector to a set increment determined by the position of said arrow with respect to the linear incremental units on said panel.

5. A wing tank photographic system for day, night, and ambient light operation comprising means mounted in said tank for making exposed film over a pre-designed course, a lighting system comprising lamps for lighting the ground terrain, masks for said lamps, a camera slit control circuit, a control panel for controlling said system, means on said panel for making mode of operation selection, a "lamps" switch on said panel for operating said lighting system to on and off, a camera slit control selector comprising linear slit opening width indications arranged in incremental units and in circular formation on said panel, a dial mounted on said panel for rotation with respect thereto and concentrically located with respect to the linear slit opening incremental units, a pointer on said panel and rigid therewith, time exposure incremental units located radially on said disc and moving with said disc with respect to said pointer, said pointer making the time exposure slit opening selection, an indicating arrow on said disc rotating therewith to provide an indicator coordinating with the linear incremental units to make fixed opening selections, the mode selector operating in day light and ambient light positions to activate said slit opening selector to time exposure selection, the position of said pointer with respect to the time exposure incremental units determining a variable slit opening, varying with respect to metered light, said artificial light mode selector operating to actuate said slit opening selector to a set increment determined by the position of said arrow with respect to the linear incremental units on said panel, said "lamps" switch being inoperative in daylight mode, said masks being operative to mask or unmask said lights in ambient or artificial light mode of operation.

6. A processing component for processing exposed film and scanning said film, said processing component comprising concentric inner and outer spaced drums mounted on a common rotating shaft, said inner drum being rigidly mounted with respect to said rotating shaft and rotatable with it, said outer drum being stationary and providing on its exterior a surface of suitable length for developing film, an opening in the surface of said inner drum for the entrance of the developed film into the interior of said inner rotating drum, means for scanning film rigidly attached to the interior surface of said inner drum, means for guiding film past said scanner, means for controlling the rate of film speed past said scanner, means for storing the developed film prior to its travel past said scanner for damping out rate differences between the rate of developing and the varying demand rates of the scanner, the excess film winding around the inner rotating drum and being stored thereon in successive layers in the space between said inner and outer drums, said inner drum being capable of reversing its direction according to the demand of the scanner.

7. A processing component for processing exposed photographic film comprising developing means, scanning means and a storing means for storing said film to dampen out rate differences between rate of developing and rate of scanning, said developing means and said storing means together comprising inner and outer spaced drums mounted on a common rotating shaft, said inner drum being rigidly mounted on said rotating shaft and rotatable with it, said outer drum being stationary and providing on its exterior a surface of suitable length for developing film, an opening in the surface of said inner drum for the entrance of the developed film into the interior of said inner rotating drum, the excess film being wound around the inner rotating drum and being stored thereon in successive layers in the space between said inner and outer drums, said inner drum being capable of reversing its direction according to the demand of the scanner.

8. A processing component for processing photographic film comprising a camera exposing said film at a varying rate, a scanner for scanning said film after development also at a varying rate, developing means and storing means interposed between said camera and said scanning means for developing said exposed film and storing said exposed film to dampen out rate differences between rate of picture taking in said camera and rate of scanning by said scanning means, said storing and developing means comprising inner and outer space drums mounted on a common rotating shaft, said inner drum being rigidly mounted on said rotating shaft and rotatable with it, said outer drum being stationary and providing on its exterior a surface of suitable length for developing film, an opening in the surface of said inner drum for the entrance of the developed film into the interior of said inner rotating drum, the excess film being wound around the inner rotating drum and being stored thereon in successive layers in the space between said inner and outer drums, said inner drum being capable of reversing its direction according to the demand of the scanner.

References Cited in the file of this patent

UNITED STATES PATENTS

| | | |
|---|---|---|
| 1,559,688 | Fairchild et al. | Nov. 3, 1925 |
| 2,064,722 | Bartow | Dec. 15, 1936 |
| 2,186,637 | Green | Jan. 9, 1940 |
| 2,401,530 | Vought | June 4, 1946 |
| 2,512,486 | Craig et al. | June 20, 1950 |
| 2,709,716 | Haller | May 31, 1955 |
| 2,859,331 | Grimes | Nov. 4, 1958 |
| 2,899,882 | Wylie | Aug. 18, 1959 |
| 2,931,858 | Hammond | Apr. 5, 1960 |
| 2,967,211 | Blackstone | Jan. 3, 1961 |

FOREIGN PATENTS

| | | |
|---|---|---|
| 145,306 | Austria | Apr. 25, 1936 |
| 800,812 | France | May 11, 1936 |
| 658,133 | Germany | Mar. 24, 1938 |
| 556,078 | Canada | Apr. 15, 1958 |